US012505946B2

(12) United States Patent
Saito et al.

(10) Patent No.: US 12,505,946 B2
(45) Date of Patent: Dec. 23, 2025

(54) COIL-EMBEDDED MAGNETIC CORE AND COIL DEVICE

(71) Applicant: TDK CORPORATION, Tokyo (JP)

(72) Inventors: Kentaro Saito, Tokyo (JP); Shota Otsuka, Tokyo (JP); Kyohei Tonoyama, Tokyo (JP); Tomonaga Nishikawa, Tokyo (JP); Mitsuo Natori, Tokyo (JP); Yuuichi Kawaguchi, Tokyo (JP); Junichi Shimamura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 820 days.

(21) Appl. No.: 17/740,693

(22) Filed: May 10, 2022

(65) Prior Publication Data

US 2022/0375675 A1 Nov. 24, 2022

(30) Foreign Application Priority Data

May 18, 2021 (JP) ................................ 2021-083934

(51) Int. Cl.
*H01F 27/25* (2006.01)
*H01F 27/255* (2006.01)
*H01F 27/29* (2006.01)

(52) U.S. Cl.
CPC ........... *H01F 27/255* (2013.01); *H01F 27/29* (2013.01)

(58) Field of Classification Search
CPC ............................... H01F 27/255; H01F 27/29
See application file for complete search history.

(56) References Cited

U.S. PATENT DOCUMENTS

2016/0155550 A1* 6/2016 Ohkubo .................... H01F 1/24 336/233
2016/0225517 A1* 8/2016 Choi ................... H01F 17/0013
2020/0223099 A1* 7/2020 Kim ......................... H01F 1/083
2020/0365315 A1* 11/2020 Kim ....................... H01F 41/046
2021/0098163 A1* 4/2021 Ishida ..................... H01F 17/04

FOREIGN PATENT DOCUMENTS

JP S60-130102 A 7/1985
JP H11-126721 A 5/1999
JP 2000160204 A * 6/2000 ............... H01F 1/26
JP 2005-264192 A 9/2005
JP 2021-057434 A 4/2021
KR 10-2016-0065007 A 6/2016
KR 20180025068 A * 3/2018

* cited by examiner

*Primary Examiner* — Malcolm Barnes
(74) *Attorney, Agent, or Firm* — Oliff PLC

(57) ABSTRACT

A coil-embedded magnetic core capable of achieving improvements both in insulation and initial magnetic permeability, and coil devices thereof. The coil-embedded magnetic core embedding a coil made of a conductor, including magnetic powder and a resin, in which the coil-embedded magnetic core further includes a modifier.

12 Claims, 7 Drawing Sheets

COIL-EMBEDDED MAGNETIC CORE AND COIL DEVICE

BACKGROUND OF THE INVENTION

1. Field of the Invention

The invention relates to a coil-embedded magnetic core and coil device, particularly to a coil device preferably used as an inductor for a power source and like, such as a choke coil for a power supply smoothing circuit in an electronic device, and a coil-embedded magnetic core included therein.

2. Description of the Related Art

In the field of consumer or industrial electronic devices, surface mount type coil devices are often used as inductors for power supplies. This is because the surface mount type coil devices are small and thin, has excellent electrical insulation, and can be produced at low cost. One of the specific structures of surface mount type coil devices is a planar coil structure that applies printed circuit board technology.

In such a coil device, the electrical and magnetic properties of the coil-embedded magnetic core that embeds the coil (conductor) have a great influence on the electrical and magnetic properties of the coil device. For example, in order to weaken magnetic aggregation forces between magnetic powders, a technique of adding a dispersant to a coil-embedded magnetic core has been proposed. See Patent Document 1: Japanese Unexamined Patent Application H11-126721.

According to the conventional technique of adding dispersants to the coil-embedded magnetic core, there was a problem that insulating property between the magnetic powders becomes insufficient when a small amount is added, while the magnetic properties are deteriorated when an excessive amount is added.

[Patent Document 1] Japanese Unexamined Patent Application H11-126721

SUMMARY OF THE INVENTION

The invention has been made in consideration of such situation. An object of the invention is to provide a coil-embedded magnetic core capable of achieving improvements both in insulation and initial magnetic permeability, and coil devices thereof.

To achieve the object, a coil-embedded magnetic core of the invention embeds a coil made of a conductor and comprises magnetic powder and a resin, in which the coil-embedded magnetic core further includes a modifier.

The coil-embedded magnetic core according to the invention includes the modifier and the modifier prevents the magnetic powder from contacting each other. Thus, improvements of both insulating property and initial magnetic permeability can be achieved simultaneously.

The modifier may include a polycaprolactone structure.

The modifier having the polycaprolactone structure has a remarkable effect of improving insulating property of the coil-embedded magnetic core and initial magnetic permeability of the same.

For example, a content of the modifier may be 0.1 to 0.8 wt % with respect to a total amount of the coil-embedded magnetic core.

By setting the content of the modifier within the above range, effects of improving insulating property of the coil-embedded magnetic core and initial magnetic permeability of the same are particularly remarkable.

For example, the magnetic powder may include a soft magnetic metal.

By using a magnetic powder including the soft magnetic metal, the initial magnetic permeability of the coil-embedded magnetic core can be increased.

For example, the magnetic powder may be a part of insulation coated particles, and each of the insulation coated particles contain a soft magnetic powder of the soft magnetic metal coated with an insulation coating including $SiO_2$.

Since the magnetic powder is a part of the insulation coated particles, insulating property of the coil-embedded magnetic core can be further improved.

For example, the magnetic powder may include at least two kinds of magnetic powders of a small-diameter powder and a large-diameter powder, mutually having different particle sizes.

By having two kinds or more of magnetic powders, such as three kinds of magnetic powders, the density of the coil-embedded magnetic core can be improved, and the initial magnetic permeability can be improved.

Further, the coil device according to the invention includes:

a coil made of a conductor;

a coil-embedded magnetic core embedding the coil, including magnetic powder and a resin; and a pair of external terminals electrically connected to the coil, wherein the coil-embedded magnetic core includes a modifier.

According to the coil device of the invention, the coil-embedded magnetic core includes the modifier, and the modifier prevents the magnetic powders from contacting each other, thereby improving both insulating property of the coil-embedded magnetic core and initial magnetic permeability of the same.

DESCRIPTION OF THE EMBODIMENTS

Figure 1:
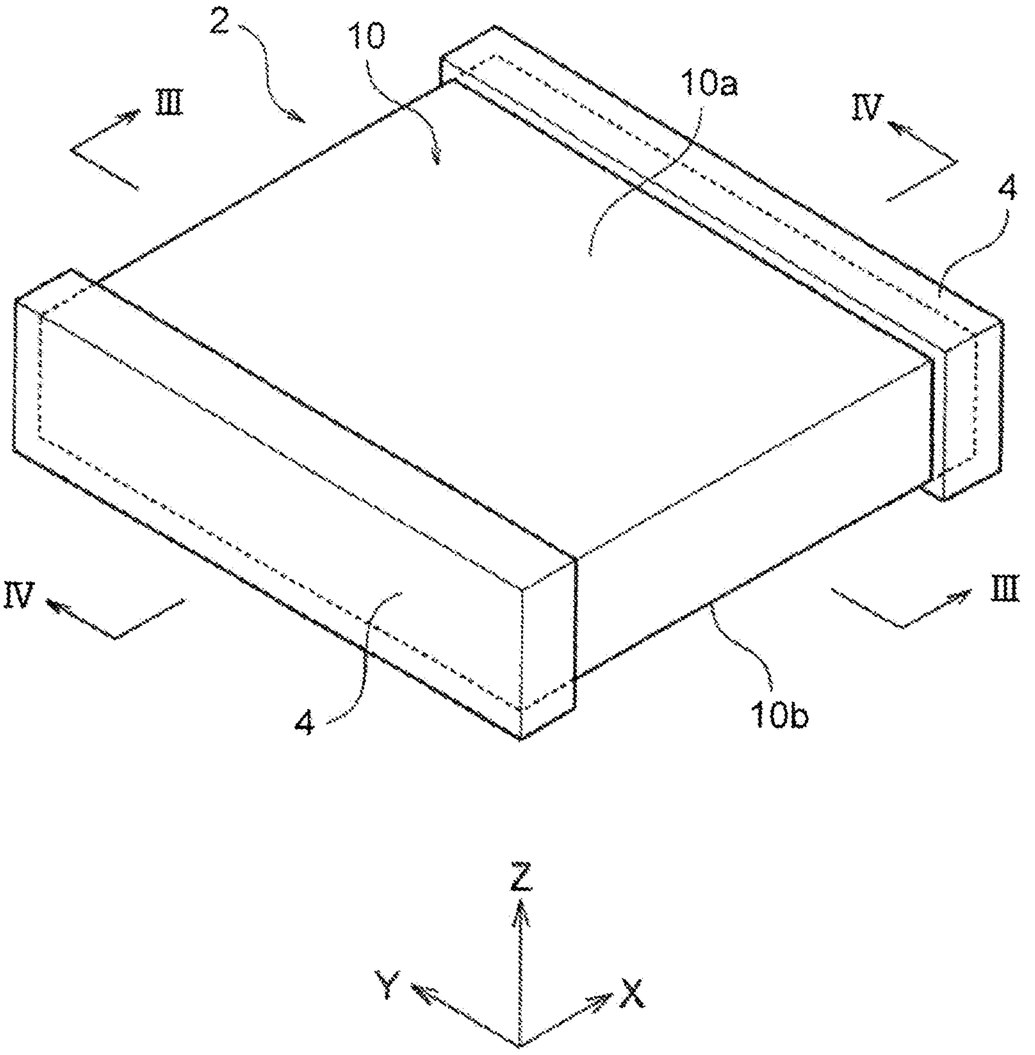
FIG. 1 is a perspective view of the coil device according to a first embodiment of the invention.

Hereinafter, the invention will be described based on the embodiments shown in the drawings.

The First Embodiment

The coil device 2 shown in FIGS. 1 to 4 are exemplified as embodiments of the coil device of the invention. As shown in FIG. 1, the coil device 2 has a rectangular flat plate-shaped main body 10 and a pair of external terminals 4, 4 mounted on both ends of the main body 10 in the X-axis direction, respectively. The external terminals 4, 4 cover the end faces of the main body 10 in the X-axis direction, and partially cover an upper surface 10*a* and a lower surface 10*b* in the Z-axis direction of the main body 10 near the end faces in the X-axis direction. Further, the external terminals 4, 4 also partially cover a pair of side surfaces of the main body 10 in the Y-axis direction.

Figure 2:
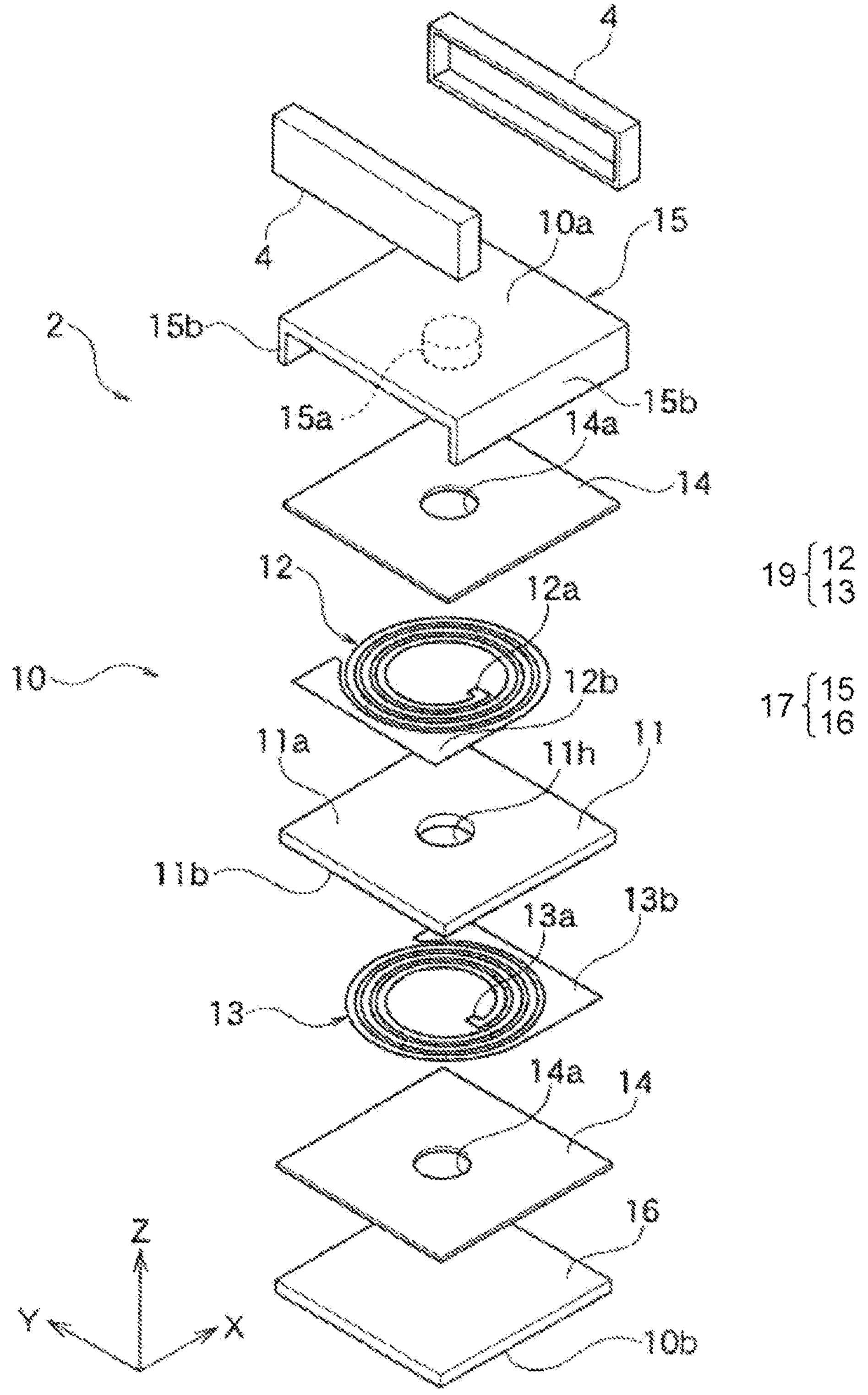
FIG. 2 is an exploded perspective view of the coil device shown in FIG. 1.
Figure 3:
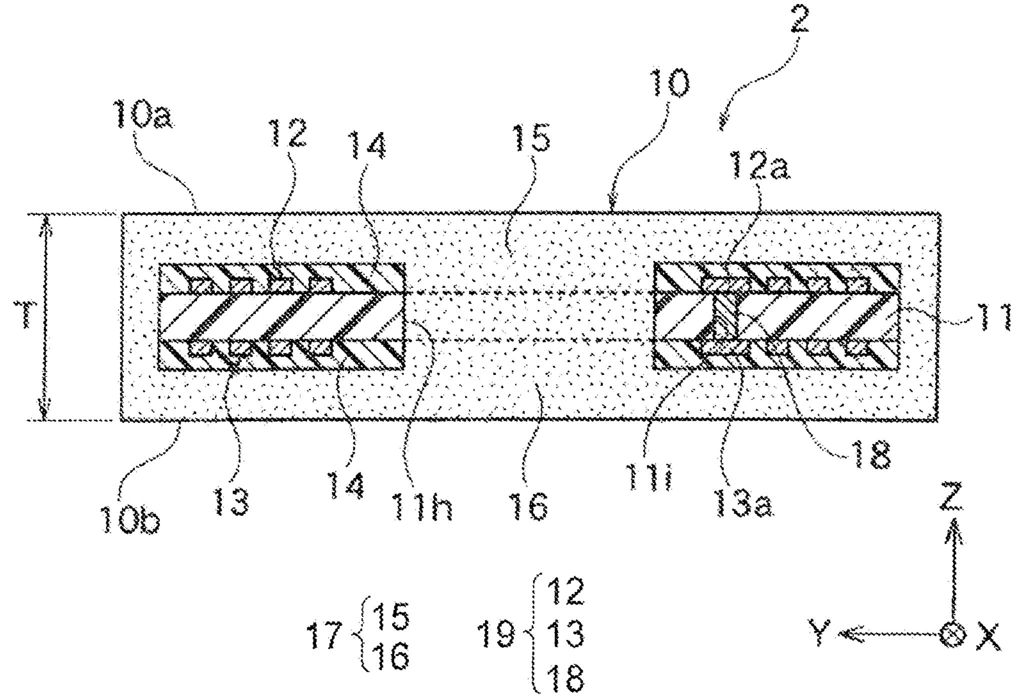
FIG. 3 is a cross-sectional view along the line shown in FIG. 1.

As shown in FIG. 2, the main body 10 has a coil 19 having the coil-embedded magnetic core 17 including an upper core 15 and a lower core 16, and a coil 19 having the internal conductor passages 12, 13 and a through-hole conductor 18 (see FIG. 3). Further, the main body 10 has an insulating substrate 11 at its center in the Z-axis direction.

The insulating substrate 11 preferably includes a general printed circuit board material in which a glass cloth is impregnated with an epoxy resin, but is not particularly limited thereto.

Although the shape of the insulating substrate 11 is rectangular in this embodiment, it may have the other shapes. The method for forming the insulating substrate 11 is not particularly limited, and it is formed by such as an injection pressing, a doctor blade method, a screen printing, or the like.

In addition, an internal electrode pattern of a circular spiral-shaped internal conductor passage 12 is formed on an upper surface (one main surface) of the insulating substrate 11 in the Z-axis direction. The inner conductor passage 12 constitutes a part of the coil 19. The material of the internal conductor passage 12 is not particularly limited, and examples thereof include good conductors of metals such as Cu and Au.

A connecting end 12*a* is formed at the inner peripheral end of the spiral inner conductor passage 12. A lead contact 12*b* is formed at the outer peripheral end of the spiral inner conductor passage 12 so as to be exposed along an end of the X-axis direction (the end in the negative direction of the X-axis) of the main body 10.

An internal electrode pattern of a spiral internal conductor passage 13 is formed on a lower surface (the other main surface) of the insulating substrate 11 in the Z-axis direction. The internal conductor passage 13 constitutes a part of the coil 19. The material of the internal conductor passage 13 is not particularly limited, however, examples thereof include good metal conductors such as Cu and Au, as in the case of the internal conductor passage 12.

A connecting end 13*a* is formed at the inner peripheral end of the spiral inner conductor passage 13. A lead contact 13*b* is formed at the outer peripheral end of the spiral inner conductor passage 13 so as to be exposed along the other end of the X-axis direction (the end in the positive direction of the X-axis) of the main body 10.

As shown in FIG. 3, the connection end 12*a* and the connection end 13*a* are formed on opposite sides of the insulating substrate 11 in the Z-axis direction, and are formed at the same position in the X-axis direction and in the Y-axis direction. The connection end 12*a* and the connection end 13*a* are electrically connected to each other via a through-hole conductor 18, embedded in a through-hole 11*i* formed in the insulating substrate 11. That is, the spiral inner conductor passage 12 and the spiral inner conductor passage 13 are electrically connected in series through the through-hole conductor 18.

As shown in FIG. 2, the spiral inner conductor passage 12 constitutes a counterclockwise spiral from the lead contact 12*b* at the outer peripheral end toward the connection end 12*a* at the inner peripheral end, when seen from the upper surface 10*a* side (the positive direction side of the X-axis) of the main body 10.

On the other hand, the spiral inner conductor passage 13 constitutes a counterclockwise spiral from the connection end 13*a* at the inner peripheral end toward the lead contact 13*b* at the outer peripheral end, when seen from the upper surface 10*a* side (the positive direction side of the X-axis) of the main body 10.

As a result, the directions of the magnetic flux generated by the current flow through the spiral inner conductor passages 12 and 13 coincide with each other at the conductor passages 12 and 13, the magnetic fluxes generated in the spiral two inner conductor passages 12 and 13 are superimposed and strengthened, and a large inductance can be obtained. In this way, the internal conductor passages 12 and 13 of conductors and the through-hole conductor 18 form the coil 19.

As shown in FIG. 2, the upper core 15 has a columnar middle leg 15*a* protruding downward in the Z-axis direction at the center of the rectangular flat plate-shaped core body. Further, the upper core 15 has plate-shaped side leg 15*b* protruding downward in the X-axis direction at both ends of the rectangular flat plate-shaped core body in the Y-axis direction.

The lower core 16 has a rectangular flat plate shape similar to the core body of the upper core 15. And the middle leg 15*a* and the side legs 15*b* of the upper core 15 are connected to the central part and ends in the Y axis direction of the lower core 16, respectively.

In FIG. 2, the coil-embedded magnetic core 17 is drawn separately into the upper core 15 and the lower core 16, but these may be integrally formed by the below-mentioned magnetic core composition. Further, the middle leg 15*a* and/or the side leg 15*b* formed on the upper core 15 may be formed on the lower core 16. In any case, the coil-embedded magnetic core 17 constitutes a completely closed magnetic path, and there is no gap in the closed magnetic path.

As shown in FIG. 2, a protective insulating layer 14 is interposed between the upper core 15 and the inner conductor passage 12, which are insulated. Further, a rectangular sheet-shaped protective insulating layer 14 is interposed between the lower core 16 and the inner conductor passage 13, which are insulated. A circular through hole 14*a* is formed in the central part of the protective insulating layer 14. Further, a circular through hole 11*h* is also formed in the central part of the insulating substrate 11. Through these through holes 14*a* and 11*h*, the middle leg 15*a* of the upper core 15 extends in the direction of the lower core 16 and is connected to the center of the lower core 16.

Figure 4:
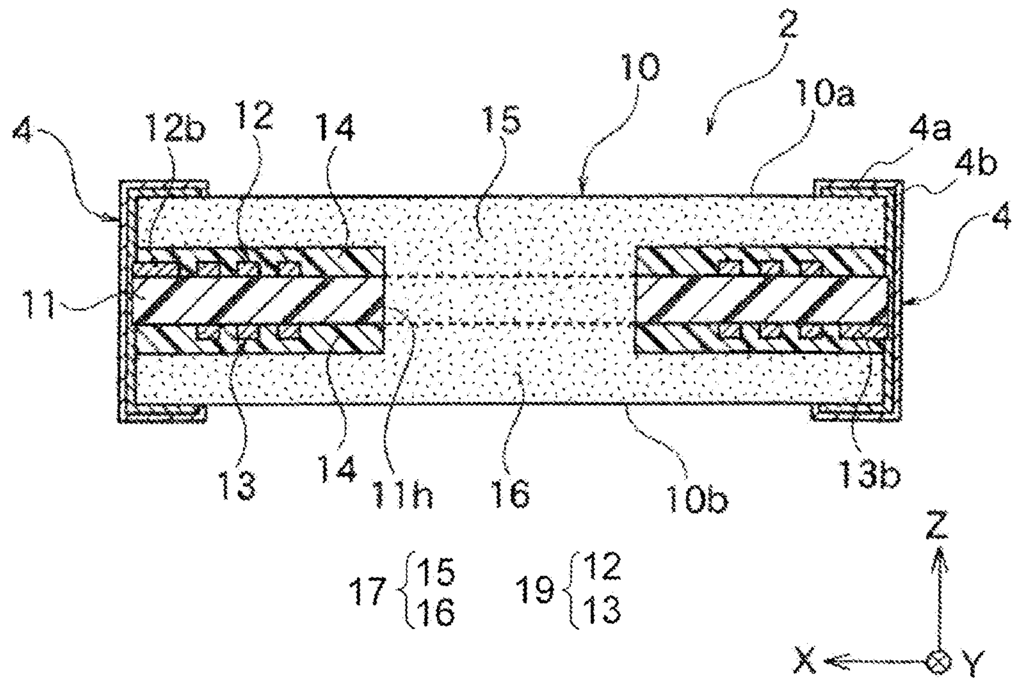
FIG. 4 is a cross-sectional view along the line IV-IV shown in FIG. 1.

As shown in FIG. 4, in the embodiment, the external terminal 4 has an inner layer 4*a* that contacts the end surface of the main body 10 in the X-axis direction and an outer layer 4*b* formed on the surface of the inner layer 4*a*. The inner layer 4*a* covers a part of the upper surface 10*a* and also a part of the lower surface 10*b* of the main body 10 near the end surface of the main body 10 in the X-axis direction. The outer surface of the inner layer 4*a* is covered by the outer layer 4*b*. As shown in FIG. 4, the pair of external terminals 4 and 4 are electrically connected to the coil 19 embedded in the coil-embedded magnetic core 17 via the lead contacts 12*b* and 13*b*.

The coil-embedded magnetic core 17 in the main body 10 includes the magnetic powder and the resin. Further, the coil-embedded magnetic core 17 further includes the modifier. That is, the coil-embedded magnetic core 17 composes the magnetic material including the magnetic powder, the resin, and the modifier.

Hereinafter, the magnetic powder in the embodiment will be described.

For example, the magnetic powder of the embodiment includes at least two kinds of magnetic powders, a small-diameter powder and a large-diameter powder mutually having different particle diameters (D50). However, the magnetic powder of the coil-embedded magnetic core 17 is not limited thereto, and may include the magnetic powders of one kind or three or more kinds of the particle sizes. Here, D50 refers to the diameter of the particle size having an integrated value of 50%.

Of the two kinds of the magnetic powders, the magnetic powder having a large D50 is referred to as the large-diameter powder, and the magnetic powder having a smaller D50 than the large-diameter powder is referred to as the small-diameter powder. The magnetic powder preferably includes the soft magnetic metal. According to the magnetic powders of the embodiment, the large-diameter powder is made of iron or an iron-based alloy, and the small-diameter powder is made of an Ni—Fe alloy, both of which are made of the soft magnetic metal. However, the small diameter powder may be made from an iron-based alloy. Further, the magnetic powder may be a ferrite powder.

The iron-based alloy of the embodiment refers to an alloy including 80 wt % or more of iron. Further, as long as iron is included in an amount of 80 wt % or more, the kind of the large-diameter powder is not particularly limited, and various Fe-based alloys and nanocrystals may be used in addition to an Fe-based amorphous powder and a carbonyl iron powder (a pure iron powder).

The Ni—Fe alloy of the embodiment refers to an alloy including 28 wt % or more of Ni and the balance being Fe and other elements. Content of the other elements is not particularly limited; however, it may be 8 wt % or less when the total Ni—Fe alloy is 100 wt %.

Further, the magnetic powder of the embodiment may be a part of the insulation coated particles 23, and each of the insulation coated particles 23 contain a soft magnetic powder 20 of the soft magnetic metal coated with an insulation coating 22 including $SiO_2$. "Coated with an insulation coating" refers to a case where 50% or more of the powder particles of all powder particles in the powder are insulating coated.

Figure 5:
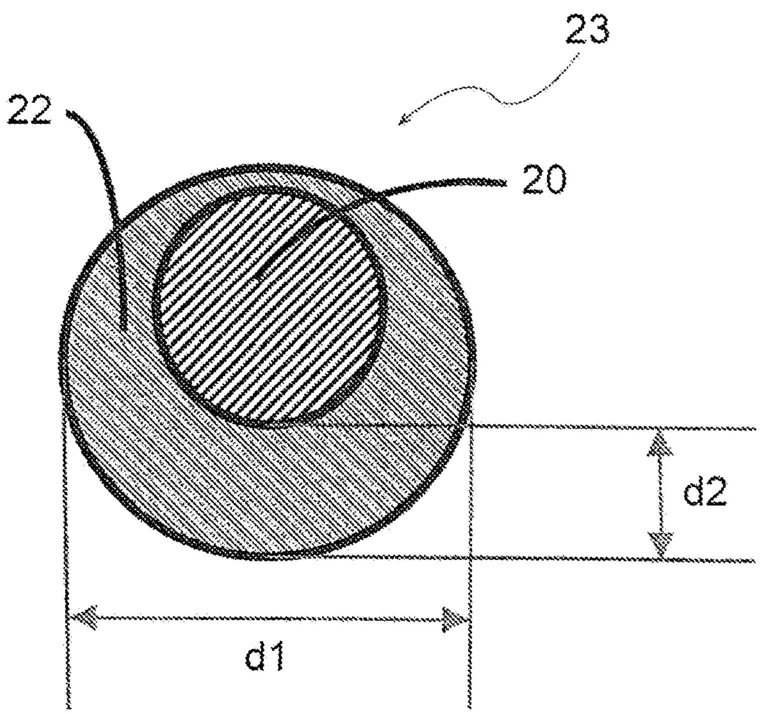
FIG. 5 is a schematic diagram of insulation coated magnetic powder.

The particle size of the insulation coated particles 23 is the length of d1 in FIG. 5. Further, the length of d2 in FIG. 5, that is, the maximum thickness of the insulation coating 22 in the insulation coated particles 23 is the thickness of the insulation coating 22 in the insulation coated particles 23. Further, the insulation coating 22 does not necessarily cover the entire surface of the soft magnetic powder 20. The soft magnetic powder 20 in which 50% or more of the surface is covered with the insulation coating 22 is considered to be the insulation coated particles 23.

Since the magnetic powder of the embodiment has the above components, it is possible to obtain the coil device 2 having an excellent initial magnetic permeability, a core loss, a withstand voltage, an insulation resistance, DC superimposition properties, and the like.

Hereinafter, the magnetic powder of the embodiment will be described in more detail.

The D50 (D50 of the insulation coated particles when the large-diameter powder is a part of the insulation coated particles 23) of the large-diameter powder is not particularly limited, however, it is preferably 10 to 40 μm and more preferably 15 to 30 μm. D50 of the small-diameter powder (D50 of the insulation coated particles 23 when the small-diameter powder is a part of the insulation coated particles 23 shown in FIG. 5) is not particularly limited, however, it is preferably 0.5 to 1.5 μm, more preferably 0.5 to 1.0 μm (not including 1.0 μm), and further more preferably 0.7 to 0.9 μm.

It is preferable that the variation in the particle size of the small-diameter powder is smaller. Specifically, D90 of the small-diameter powder (the diameter of the particle size where the integrated value is 90%, and D90 of the insulation coated particles when the small-diameter powder is a part of the insulation coated particles 23) is preferably 4.0 μm or less. When D90 is 4.0 μm or less, the initial magnetic permeability is improved and the core loss is reduced.

The large-diameter powder and the small-diameter powder are preferably spherical. According to the embodiment, the term "spherical" specifically refers to a case where a sphericity of the powder is 0.9 or more. The sphericity can be measured by an image particle size distribution meter.

A content of Ni in the Ni—Fe alloy is preferably 40 to 85%, and particularly preferably 75 to 82%. By including the Ni content within the above range, the initial magnetic permeability improves and the core loss reduces. The above contents are shown in weight ratios.

The blending ratio of the small-diameter powder with respect to the total magnetic powder is preferably 5 to 25%, and more preferably 6.5 to 20%. By setting the blending ratio of the small-diameter powder within the above range, the initial magnetic permeability improves and the core loss reduces. The above blending ratio is shown in weight ratios.

The thickness of the insulation coating 22 is not particularly limited, however, the average thickness of the insulation coating 22 of the small-diameter powder is preferably 5 to 45 nm, and particularly preferably 10 to 35 nm. The thickness of the insulation coating 22 for the large-diameter powder and the same of the small-diameter powder may be the same, or the thickness of the insulation coating 22 for the large-diameter powder may be larger than the same of the small-diameter powder.

The material of the insulation coating 22 is not particularly limited, and an insulation coating generally used in this technical field can be used. A film including a glass made from $SiO_2$ or a phosphate chemical conversion film including a phosphate is preferable, and the film including the glass made of $SiO_2$ is particularly preferable. In addition, the method of insulation coating is not particularly limited, and a generally used method in the technical field can be used.

Further, the magnetic powder of the embodiment may further include a medium-diameter powder having D50, smaller than the D50 of the large-diameter powder and larger than the D50 of the small-diameter powder. Namely, the magnetic powder may include at least three kinds of magnetic powders having different particle sizes: the small-diameter powder, the medium-diameter powder, and the large-diameter powder.

In this case, it is preferable that the medium-diameter powder is also insulation coated as well as the large-diameter powder and the small-diameter powder.

D50 of the medium-diameter powder (D50 of the insulation coated particles 23 shown in FIG. 5 when the medium-diameter powder is a part of the insulation coated particles 23) is preferably 3.0 to 10 μm. The magnetic permeability improves when D50 of the medium diameter powder is within the above range.

The material of the medium-diameter powder is not particularly limited, and it is preferably made of iron or an iron-based alloy, similar to the same of the large-diameter powder.

In addition, the blending ratios of each powder with respect to the whole magnetic powder are preferably as follows. The blending ratio of the large-diameter powder is 70 to 80%, the same of the medium-diameter powder is 10 to 15%, and the same of the small-diameter powder is 10 to 15%. With the above blending ratio, it is particular that the core loss reduces and the magnetic permeability improves.

According to the embodiment, the particle sizes, the thickness of the insulation coating, and the like of the large-diameter powder, the medium-diameter powder, and the small-diameter powder are measured by a transmission electron microscope. Generally, the particle sizes and the materials of the large-diameter powder, the medium-diameter powder, and the small-diameter powder according to the embodiment do not substantially change in the producing process of the coil device 2.

By using the above-mentioned insulation coated magnetic powder as the magnetic powder of the embodiment, under a low pressure pressing or a non-pressure pressing, a high-density coil-embedded magnetic core 17 can be formed, and the coil-embedded magnetic core 17 having a high magnetic permeability and a low loss can be realized.

The reason why the high-density coil-embedded magnetic core 17 can be obtained is presumed that the medium-diameter powder and/or the small-diameter powder fill the gap generated when only the large-diameter powder is used. In addition, in order to further increase the density of the coil-embedded magnetic core 17, it can be considered only to use the small-diameter powder and not to use the medium-diameter powder. By not using the medium-diameter powder, a coil-embedded magnetic core 17 having a higher magnetic permeability relative to the same using the medium-diameter powder may be obtained.

On the other hand, when both the medium-diameter powder and the small-diameter powder are used, the coil-embedded magnetic core 17, showing a small change in properties even there are changes in various conditions such as the Ni content change in the small-diameter powder, can be obtained. Therefore, when both the medium-diameter powder and the small-diameter powder are used, the manufacturing stability of the coil-embedded magnetic core 17 is higher than the coil-embedded magnetic core 17 when only the small-diameter powder is used.

A content of the magnetic powder in the coil-embedded magnetic core 17 is preferably 90 to 99 wt %, and more preferably 95 to 99 wt %. The saturated magnetic flux density and the magnetic permeability become small when the amount of the magnetic powder with respect to the resin or the modifier is reduced, while the saturated magnetic flux density and the magnetic permeability become large when the amount of the magnetic powder with respect to the resin or the modifier is increased. That is, the saturation magnetic flux density and the magnetic permeability can be adjusted with the amount of the magnetic powder.

The resin included in the coil-embedded magnetic core 17 functions as an insulating binder. It is preferable to use a liquid epoxy resin or a powder epoxy resin as the resin material. A resin content is preferably 1 to 10 wt %, and more preferably 1 to 5 wt %. In addition, when the magnetic powder, the resin, and the modifier are mixed, it is preferable to use a resin solution to obtain a magnetic core composition. The solvent of the resin solution is not particularly limited.

The modifier included in the coil-embedded magnetic core 17 prevents the magnetic powder from mutual contacts. The material of the modifier preferably has a polycaprolactone structure. Examples of the material having polycaprolactone structure include a raw material for urethane or a part of polyester, such as polycaprolactone diol and polycaprolactone tetraol.

The content of the modifier in the coil-embedded magnetic core 17 is preferably 0.1 to 0.8 wt % with respect to the total amount of the coil-embedded magnetic core 17. By setting the modifier content to a predetermined value or more, effective improvement of insulating property and initial magnetic permeability can be expected. Further, by setting the modifier content to a predetermined value or less, it is possible to prevent a decrease in the three-point bending strength. In the coil-embedded magnetic core 17, the resin reacts with heat and functions as a binder, whereas the modifier does not react as the resin. Moreover, the same effect as the modifier cannot be obtained by the conventional dispersant. The reason for this is presumed that the modifier is adsorbed on the entire surface so as to coat the surface of the magnetic powder, whereas the dispersant has a part that adsorbs (adsorption group) on the surface of the magnetic powder and a part that does not adsorb on the same.

Hereinafter, a method for producing the coil device 2 will be described.

First, spiral internal conductor passages 12 and 13 are formed on the insulating substrate 11 by a plating method. Conditions of the plating methods are not particularly limited. Further, it may be formed by a method other than the plating method.

Next, the protective insulating layers 14 are formed on both sides of the insulating substrate 11 on which the internal conductor passages 12 and 13 are formed. The method for forming the protective insulating layer 14 is not particularly limited. For example, the protective insulating layer 14 can be formed by immersing the insulating substrate 11 in a resin solution diluted with a solvent having a high boiling point and drying the same.

Next, the coil-embedded magnetic core 17, including a combination of the upper core 15 and the lower core 16 shown in FIG. 2, is formed. Therefore, the above-mentioned magnetic core composition is applied to the surface of the insulating substrate 11 on which the protective insulating layer 14 is formed. The coating method is not particularly limited, but it is generally applied by a printing method.

Next, the solvent component of the magnetic core composition applied by the printing method is volatilized to form the coil-embedded magnetic core 17, and the main body 10 shown in FIG. 1 is formed.

The densities of the main body 10 and of the coil-embedded magnetic core 17 are improved. The method for improving the densities of the main body 10 and of the coil-embedded magnetic core 17 is not particularly limited, and examples thereof include a pressing method.

Then, the upper surface 10*a* and the lower surface 10*b* of the main body 10 are ground to make the main body 10 having a predetermined thickness. Then, the resin is heat-cured to crosslink. The grinding method is not particularly limited, and examples thereof include a method using a fixed grindstone. In addition, the temperature and time of thermosetting are not particularly limited and may be appropriately controlled depending on the kind of resin and the like.

After that, the main body 10 is cut into individual pieces. The cutting method is not particularly limited, and examples thereof include a dicing method.

The main body 10, before mounting the external terminal 4 shown in FIG. 1, can be obtained by the above method. In the state before cutting, the main body 10 is integrally connected in the X-axis direction and the Y-axis direction.

After the cutting process, the individualized main body 10 is subjected to an etching process. The conditions for the etching process are not particularly limited.

Next, the electrode material is applied to both ends of the etched main body 10 in the X-axis direction to form the inner layer 4*a*. As the electrode material, a conductor powder included resin, including a conductor powder such as an Ag powder in thermosetting resin such as epoxy resin, similar to the epoxy resin used in the above-mentioned magnetic core composition, is used.

Next, the product coated with the electrode paste which becomes the inner layer 4*a* is subjected to terminal plating by a barrel plating to form the outer layer 4*b*. The outer layer 4*b* may have a multi-layer structure of two or more layers. The forming method and material of the outer layer 4*b* are not particularly limited, and for example, the outer layer 4*b* can be formed by subjecting an Ni plating on the inner layer 4*a*, and then subjecting Sn plating on the Ni plating. The coil device 2 can be produced by the above method.

In the embodiment, the coil-embedded magnetic core 17 of the main body 10 includes the magnetic powder and the resin. Thus, the saturation magnetic flux density can be increased by forming minute gaps between the magnetic powders. Therefore, magnetic saturation can be prevented without forming air gaps between the upper core 15 and the lower core 16, and it becomes unnecessary to machine the magnetic core with a high accuracy to form the gap.

According to the coil device 2 of the embodiment, it becomes possible to obtain an extremely high position accuracy of the coil 19, and to reduce the size and the thickness, by forming an aggregate on the substrate surface. By using a soft magnetic metal material as the magnetic powder, the DC superimposition property is improved as compared with ferrite, and the formation of a magnetic gap can be omitted.

In the coil device 2, the magnetic core composition and the coil-embedded magnetic core 17 include the modifier having a polycaprolactone structure. Thus, contacts between magnetic powders in the coil-embedded magnetic core 17 can be suppressed. Thereby, insulation property and initial magnetic permeability of the coil-embedded magnetic core 17 can be improved.

The invention is not limited to the above-described embodiment, and can be variously modified within the scope of the invention. For example, even if the formation is other than the coil device shown in FIGS. 1 to 4, any coil-embedded magnetic core that embeds the coil 19 and includes magnetic powder, a resin, and a modifier is the coil device of the invention.

The Second Embodiment

Figure 9:
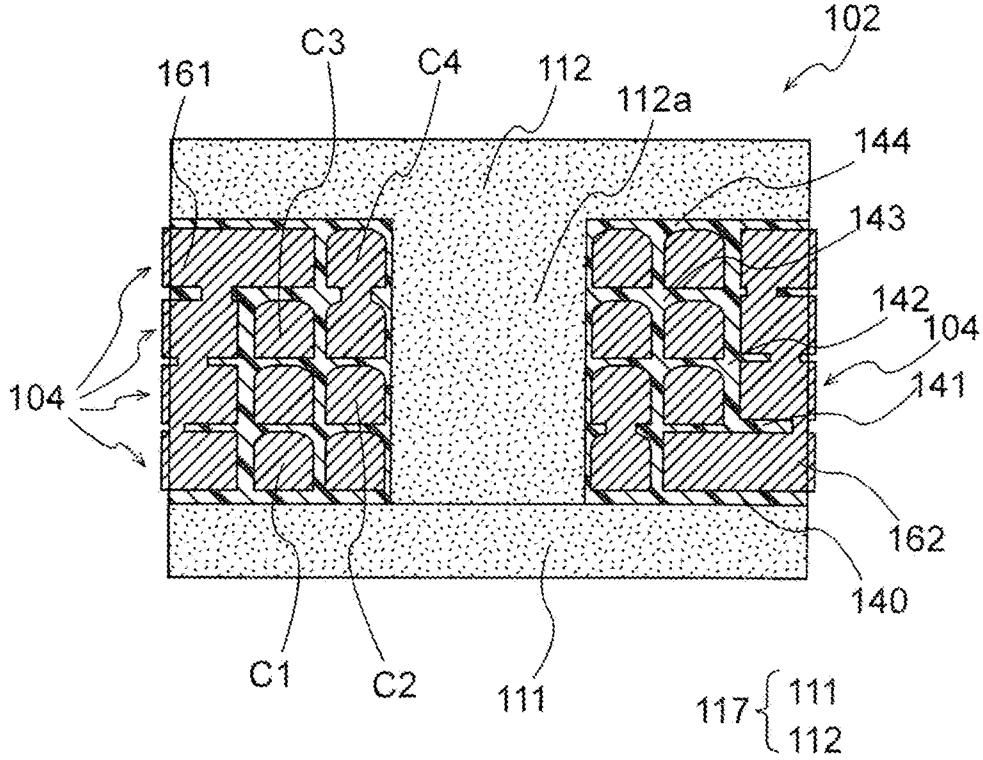
FIG. 9 is a cross sectional view of the coil device according to a second embodiment of the invention.

FIG. 9 is a cross-sectional view showing a coil device 102 according to a second embodiment of the invention. The coil device 102 has a partially different structure from the coil device 2 shown in FIG. 2, and has a coil composed of a plurality of the coil conductor patterns C1, C2, C3, and C4, a coil-embedded magnetic core 117 composed of magnetic material layers 111 and 112 including magnetic powder and resin, and a pair of external terminals 104 and 104 that are electrically connected to the coil. In addition, the coil device 102 has interlayer insulating layers 140, 141, 142, 143, 144 and electrode layers 161, 162.

Each of the coil conductor patterns C1 to C4 shown in FIG. 9 forms a coil pattern wound spirally for two turns. Each coil conductor patterns C1 to C4 is laminated via the interlayer insulating layers 141 to 144. The coil conductor patterns C1 to C4 adjacent to each other vertically are connected to each other through a via conductor penetrating the interlayer insulating layers 141 to 143 sandwiched therebetween. As a result, the coil conductor patterns C1 to C4 are mutually connected and form one coil.

The coil conductor patterns C1 to C4 and the via conductor are made by a good conductor such as Cu, and the interlayer insulating layers 141 to 143 are formed by a resin or the like.

The coil-embedded magnetic core 117 of the magnetic material layers 111 and 112 is made from the same material as the coil-embedded magnetic core 17 of the upper core 15 and the lower core 16 shown in FIG. 2, and forms a closed magnetic path. Further, the coil-embedded magnetic core 117 of the magnetic material layers 111 and 112 includes a modifier, similar to the coil-embedded magnetic core 17 shown in FIG. 2. The magnetic powder, the resin, and the modifier included in the magnetic layers 111 and 112 can be the same as the magnetic powder, the resin, and the modifier included in the coil-embedded magnetic core 17 of the first embodiment.

A pair of the external terminals 104 formed on the side surface of the coil device 102 are connected to the coils (the coil conductor patterns C1 to C4) embedded in the coil-embedded magnetic core 117 via the electrode layers 161 and 162. The electrode layers 161 and 162 include, for example, Cu, and the external terminal 104 includes, for example, a laminated film of Ni and Sn, but is not limited thereto.

The coil device 102 according to the second embodiment may be produced as follows. That is, the resin layers which become the interlayer insulating layers 140 to 144 and the conductor layers which become the coil conductor patterns C1 to C4 and the electrode layers 161 and 162 are alternately laminated on a predetermined support substrate. Then, the resin of the unnecessary part (for example, the part corresponding to the middle leg 112*a* of the magnetic material layer 112) is removed. The magnetic core composition similar to the same when producing the coil-embedded magnetic core 17 described in the first embodiment is embedded in the space where the resin has been removed to form the magnetic material layer 112. And then the support substrate is removed, and further using the similar magnetic composition, the magnetic layer 111 is formed.

Next, after thermosetting to crosslink the resin included in the magnetic material layers 111 and 112, the resin is cut into individual pieces to expose the electrode layers 161 and 162, and the external terminal 104 is formed on the electrode layers 161 and 162 to obtain the coil device 102 shown in FIG. 9. The interlayer insulating layers 140 to 144 can be formed by coating with a spin coating method or patterning by a photography method. Further, the conductor layers to be the coil conductor patterns C1 to C4 and the electrode layers 161 and 162 can be formed by film formation by a thin film method such as sputtering and film growth by an electrolytic plating method.

In the coil device 102 shown in FIG. 9, similarly to the coil device 2 according to the first embodiment, the magnetic core composition and the coil-embedded magnetic core 117 include a modifier having a polycaprolactone structure. Thus, adhesion between the magnetic powders in the coil-embedded magnetic core 117 can be suppressed. Thereby, insulating property of the coil-embedded magnetic core 117 and initial magnetic permeability of the same can be improved. Further, the coil device 102 has the same effect as the coil device 2, regarding the common part with the coil device 2.

Example

Hereinafter, the invention will be described with reference to examples, however, the invention is not limited thereto.

10 kinds of samples in which the contents of the modifier included in the coil-embedded magnetic core 17 were 0 wt %, 0.1 wt %, 0.2 wt %, 0.3 wt %, 0.4 wt %, 0.5 wt %, 0.6 wt %, 0.8 wt %, 1.0 wt %, or 1.2 wt % with respect to the total amount of the coil-embedded magnetic core 17 were prepared. For each sample, initial magnetic permeability μi, dielectric breakdown strength (electrical resistance), and three-point bending strength were evaluated. The modifier having a polycaprolactone structure (trade name BYK-LP C 22435 (manufacturer: BYK)) was used.

The components other than the modifier included in the coil-embedded magnetic core 17 were common in each sample, and were as shown below.

<Magnetic Powder>

(1) Large-diameter powder: Fe-based amorphous powder (D50: 26 μm)

(2) Medium-diameter powder: carbonyl iron powder (D50: 4.0 μm)

(3) Small-diameter powder: Ni—Fe alloy powder (Ni content rate: 78 wt %, D50:0.9 μm, D90:1.2 μm)

In the coil-embedded magnetic core 17, 80% of the large-diameter powder, 10% of the medium-diameter powder, and 10% of the small-diameter powder were blended as the magnetic powder. For each large-diameter powder, medium-diameter powder, and small-diameter powder, an insulating film of glass including $SiO_2$ was formed to make the film thickness of 20 nm or more.

<Resin>

Epoxy Resin

Ten kinds of magnetic core compositions were prepared by blending the epoxy resin and the modifier with respect to the magnetic powder in the blending ratios shown in Table 1 and further adding a solvent. Using the prepared magnetic core composition, samples for measuring dielectric breakdown strength, initial magnetic permeability, and three-point bending strength were prepared.

TABLE 1

| | Magnetic Powder | Epoxy Resin | Modifier |
|---|---|---|---|
| Blending Ratio 1 | 98 | 2.0 | 0.0 |
| Blending Ratio 2 | 98 | 1.9 | 0.1 |
| Blending Ratio 3 | 98 | 1.8 | 0.2 |
| Blending Ratio 4 | 98 | 1.7 | 0.3 |
| Blending Ratio 5 | 98 | 1.6 | 0.4 |
| Blending Ratio 6 | 98 | 1.5 | 0.5 |
| Blending Ratio 7 | 98 | 1.4 | 0.6 |
| Blending Ratio 8 | 98 | 1.2 | 0.8 |
| Blending Ratio 9 | 98 | 1.0 | 1.0 |
| Blending Ratio 10 | 98 | 0.8 | 1.2 |

(unit: wt %)

<Dielectric Breakdown Strength>

Figure 6:
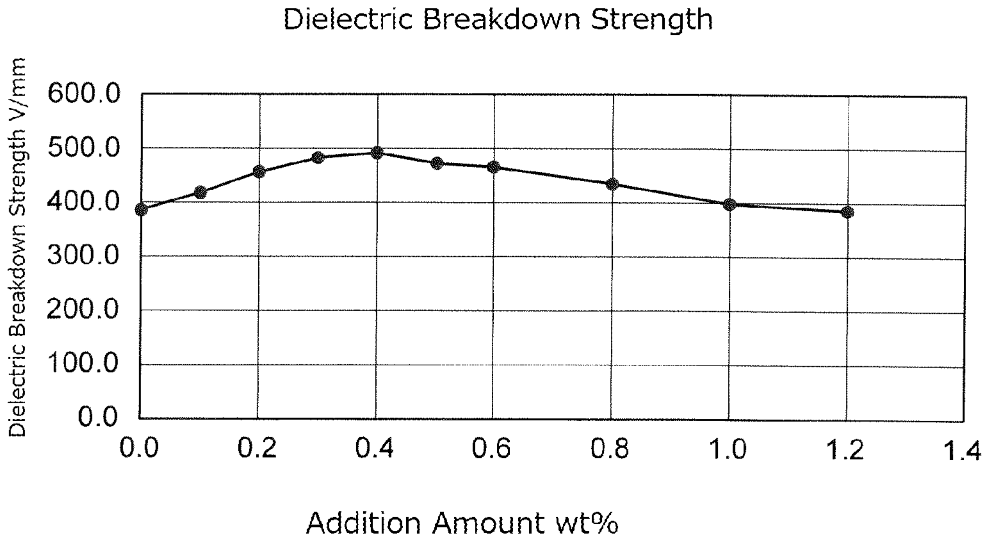
FIG. 6 is a graph showing measurement results regarding the added amount of the modifier and the dielectric breakdown strength of the coil-embedded magnetic core.

In dielectric breakdown strength test, samples of coil-embedded magnetic cores pressed and cured to a thickness of 0.65 mm were prepared using the above-mentioned magnetic compositions. In the dielectric breakdown strength test, the voltage, when a DC current of 2 mA flows in the thickness direction of the prepared samples, were measured. Then the dielectric breakdown strength (V/mm) was calculated based on the measured voltage. FIG. 6 is a graph showing the results of measuring the dielectric breakdown strength of 10 kinds of samples having different contents of the modifier.

As shown in FIG. 6, the samples including the modifier show an improvement in dielectric breakdown strength as compared with the sample with no modifier (addition amount: 0 wt %). Among the 10 kinds of samples, the sample in which the added amount of the modifier was 0.4 wt % had a preferable dielectric breakdown strength, the samples in which the added amount of the modifier were 0.1 to 0.8 wt % showed remarkable property improvements, and the samples in which the added amount of the modifier were 0.2 to 0.6 wt % showed particularly remarkable property improvements.

<Initial Magnetic Permeability>

Figure 7:
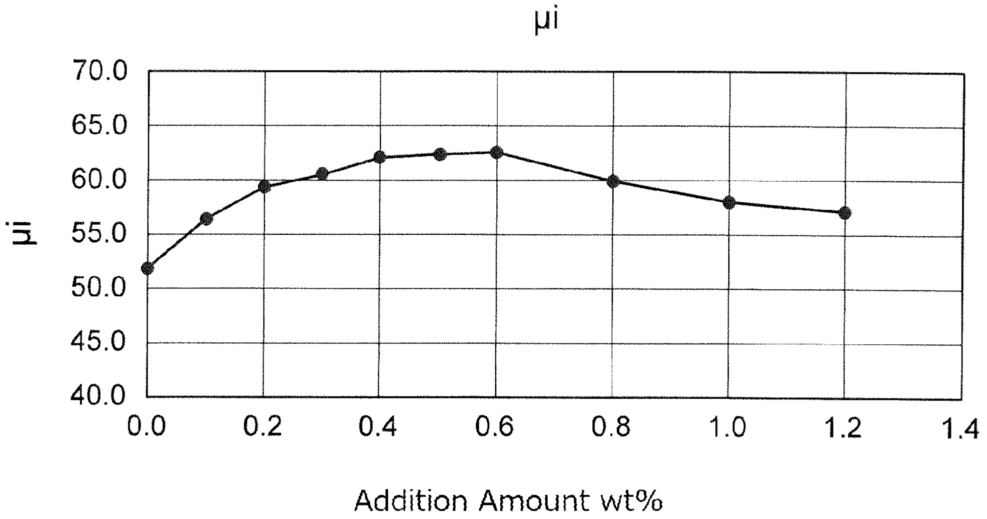
FIG. 7 is a graph showing measurement results regarding the added amount of the modifier and the initial magnetic permeability of the coil-embedded magnetic core.

In the initial magnetic permeability test, the prepared magnetic core composition was applied to the insulating substrate 11, on which the protective insulating layer 14 and the internal conductor passages 12 and 13 shown in FIG. 2 were formed, then pressed and cured thereof to obtain the main body 10. External terminals 4 having a width of 1.3 mm were provided at both ends of the main body 10 and samples similar to the coil device 2 (except the modifier content varies) shown in FIGS. 1 to 4 were prepared. FIG. 7 is a graph showing the results of measuring the initial magnetic permeability μi for 10 kinds of samples having different modifier contents.

As shown in FIG. 7, the sample including the modifier shows an improvement in the initial magnetic permeability μi as compared with the sample not including the modifier (addition amount: 0 wt %). Among the 10 kinds of samples, the sample in which the added amount of the modifier was 0.6 wt % had the most preferable initial magnetic permeability μi, the samples in which the added amount of the modifier were 0.2 to 0.8 wt % showed remarkable property improvements, and the samples in which the added amount of the modifier were 0.3 to 0.6 wt % showed particularly remarkable property improvements.

<Three-Point Bending Strength>

Figure 8:
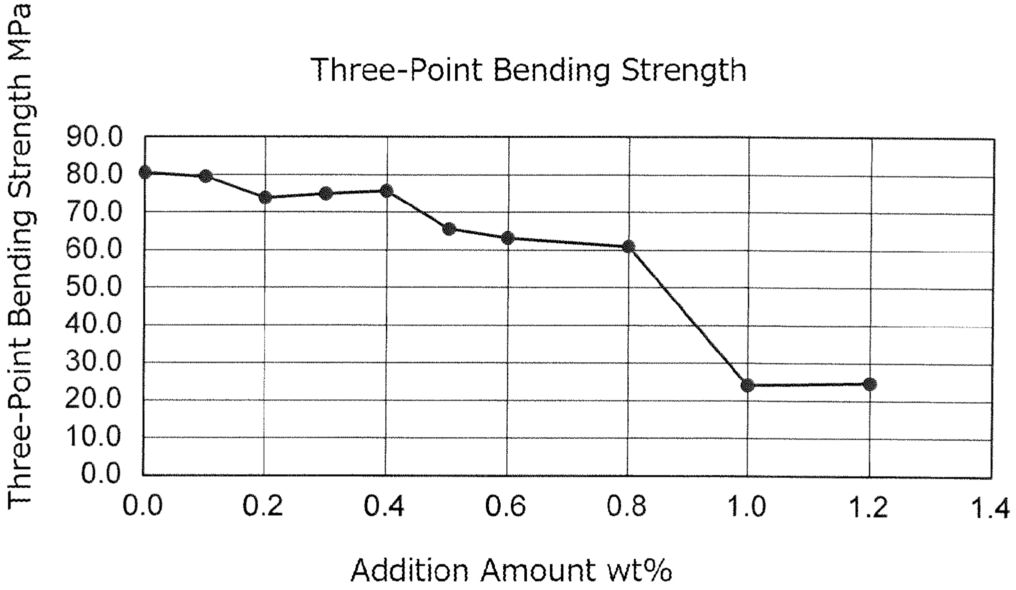
FIG. 8 is a graph showing measurement results regarding the added amount of the modifier and the three-point bending strength of the coil-embedded magnetic core.

For the three-point bending strength test, samples of the coil-embedded magnetic core pressed into a width of 5 mm, a length of 30 mm, and a thickness of 0.7 mm were produced using the prepared magnetic core composition. In the three-point bending strength test, an autograph (AGS-X made by Shimadzu Corporation) was used to measure the three-point bending strength of each sample having different content of the modifier at room temperature. The measurement conditions were a load cell capacity of 5 kN, a distance between fulcrums of 10 mm, and a test speed of 1 mm/min. From the load W(N) at break measured by the autograph, the three-point bending strength a was calculated by the following equation 1. $\sigma=(3\times L\times W)/(2\times b\times h\hat{}2)$ (Equation 1) In Equation 1, L is the distance between fulcrums, b is the width of the sample, and h is the thickness of the sample. FIG. 8 is a graph showing the results of measuring the three-point bending strength of 10 kinds of samples, each having different content of the modifier.

As shown in FIG. 8, the sample including the modifier tends to have a slightly lower three-point bending strength than the sample not including the modifier (addition amount: 0 wt %). However, the samples in which the added amount of the modifier were 0.8 wt % or less showed the value of 60 MPa or more, and it was confirmed that the sample had sufficient three-point bending strength.

EXPLANATION OF REFERENCES

2, 102 . . . Coil Device
4 . . . External Terminal
4_a_ . . . Inner Layer
4_b_ . . . Outer Layer
10 . . . Main Body
10_a_ . . . Upper Surface
10_b_ . . . Lower Surface
17 . . . Coil-Embedded Magnetic Core
11 . . . Insulating Substrate
12, 13 . . . Internal Conductor Passages
12_a_, 13_a_ . . . Connection Ends
12_b_, 13_b_ . . . Lead Contacts
14 . . . Protective Insulating Layer
15 . . . Upper Core
15_a_ . . . Middle Leg
15_b_ . . . Side Legs
16 . . . Lower Core
18 . . . Through-Hole Conductor
20 . . . Magnetic Powder
22 . . . Insulation Coated Particle
22 . . . Insulation Coating
11_i_ . . . Through Hole
C1 to C4 . . . Coil Conductor Patterns
111, 112 . . . Magnetic Material Layers
117 . . . Coil-Embedded Magnetic Core
104, 105 . . . External Terminals
140 to 144 . . . Interlayer Insulation Layers
161, 162 . . . Electrode Layers

What is claimed is:

1. A coil-embedded magnetic core embedding a coil made of a conductor, comprising magnetic powder and a resin, wherein
the coil-embedded magnetic core further comprises a modifier,
the modifier comprises a polycaprolactone structure,
a content of the magnetic powder in the coil-embedded magnetic core is preferably 90 to 99 wt %, and
a content of the modifier is 0.3 to 0.8 wt %,
the wt % s being with respect to a total amount of the coil-embedded magnetic core.

2. The coil-embedded magnetic core described in claim 1, wherein
a content of the modifier is 0.3 to 0.6 wt % with respect to a total amount of the coil-embedded magnetic core.

3. The coil-embedded magnetic core described in claim 1, wherein
the magnetic powder comprises a soft magnetic metal.

4. The coil-embedded magnetic core described in claim 3, wherein
the magnetic powder is a part of insulation coated particles, and each of the insulation coated particles contain a soft magnetic powder of the soft magnetic metal coated with an insulation coating including $SiO_2$.

5. The coil-embedded magnetic core described in claim 1, wherein
the magnetic powder includes at least two kinds of magnetic powders comprising a small-diameter powder and a large-diameter powder mutually having different particle sizes.

6. The coil-embedded magnetic core described in claim 5, wherein
D90 of the small-diameter powder is 4.0 μm or less, and the small-diameter powder is coated.

7. The coil-embedded magnetic core described in claim 5, wherein
a composition of the small-diameter powder comprises Fe—Ni.

8. The coil-embedded magnetic core described in claim 5, wherein
a blending ratio of the small-diameter powder with respect to the total magnetic powder is 6.5 to 20 wt %.

9. The coil-embedded magnetic core described in claim 5, wherein
the thickness of the insulating coating of the large-diameter powders of magnetic powder is thicker than the insulating coating of the small-diameter powder of the magnetic powder.

10. The coil-embedded magnetic core described in claim 5, further having a medium diameter powder lager in particle size than the small-diameter powder and smaller than the large-diameter powder.

11. The coil-embedded magnetic core described in claim 1, wherein
a content of the modifier is 0.4 to 0.6 wt % with respect to a total amount of the coil-embedded magnetic core.

12. A coil device comprising:
a coil made of a conductor;
a coil-embedded magnetic core embedding the coil, comprising magnetic powder and a resin; and
a pair of external terminals electrically connected to the coil, wherein
the coil-embedded magnetic core comprises a modifier,
the modifier comprises a polycaprolactone structure,
a content of the magnetic powder in the coil-embedded magnetic core is preferably 90 to 99 wt %, and
a content of the modifier is 0.3 to 0.8 wt %,
the wt % s being with respect to a total amount of the coil-embedded magnetic core.

* * * * *